Nov. 25, 1969  R. O. HERMANSON ET AL  3,479,903
MOTION TRANSMITTING REMOTE CONTROL ASSEMBLY
Filed June 12, 1967
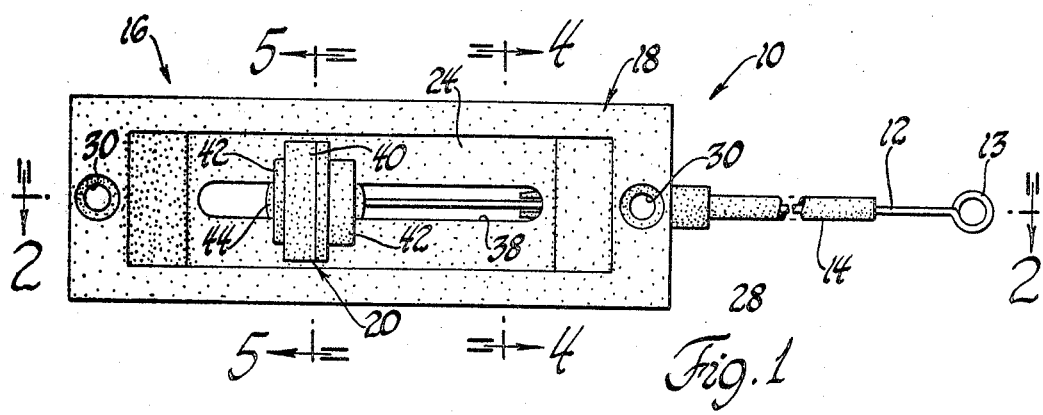
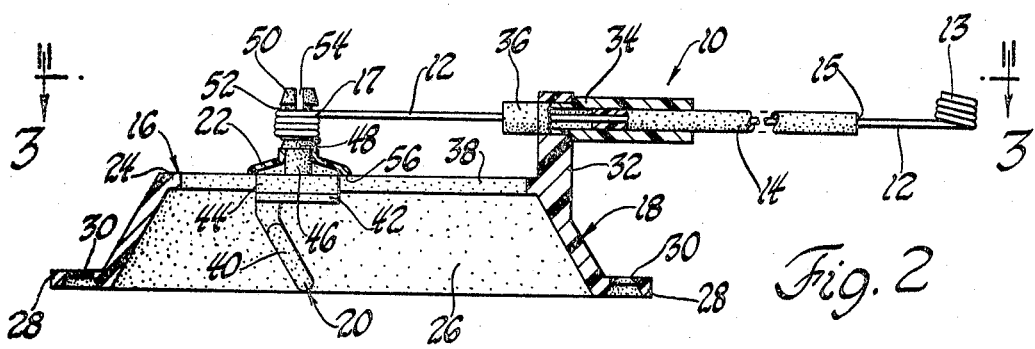
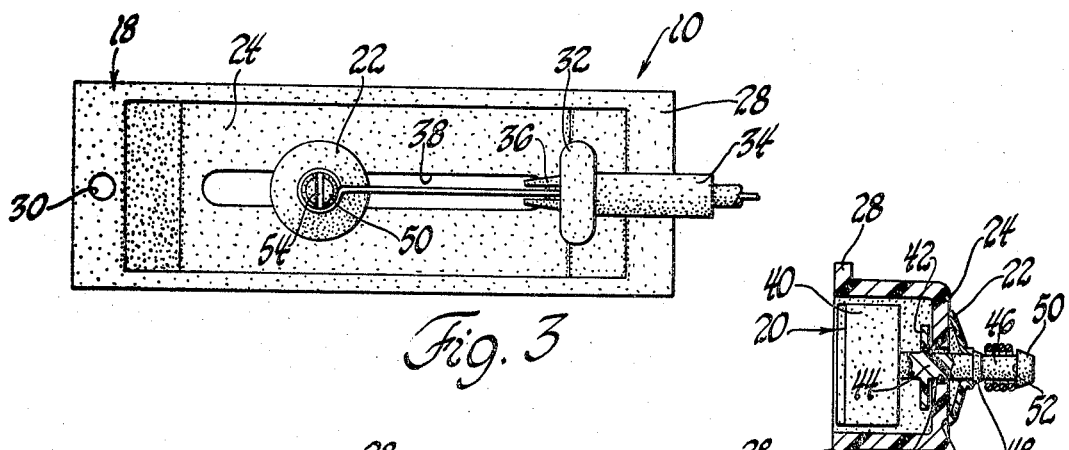
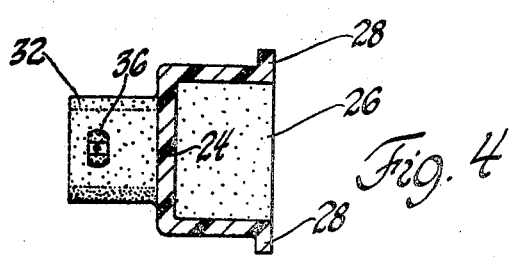
INVENTORS
Ronald O. Hermanson
& Arno Hellthaler
Barnard, McGlynn & Reising
ATTORNEYS

United States Patent Office 3,479,903
Patented Nov. 25, 1969

3,479,903
MOTION TRANSMITTING REMOTE CONTROL ASSEMBLY
Ronald O. Hermanson and Arno Hellthaler, Detroit, Mich., assignors to Teleflex Incorporated, North Wales, Pa., a corporation of Delaware
Filed June 12, 1967, Ser. No. 645,359
Int. Cl. F16c *1/10*
U.S. Cl. 74—502
25 Claims

ABSTRACT OF THE DISCLOSURE

A motion transmitting remote control assembly of the type which is operated to control a device by transmitting tension or compression in a curved path by a flexible core element and including a support body having a wall with an elongated slot therein with a slider member slidably supported by the support body for bearing engagement with one face of the wall and extending through the slot with a washer-like element snapped onto and retained on the slider member for bearing engagement with the opposite face of the wall for providing a predetermined resistance to the sliding movement of the slider member.

---

Remote control assemblies of the type to which the instant invention pertains are typically used in marine aircraft and automotive vehicles. Such remote control assemblies are frequently used in automobiles for controlling vents, heaters, and the like. These remote control assemblies typically include a flexible conduit with a motion transmitting core element movably supported in the conduit and an end fitting secured to one end of the conduit with the core element extending into the end fitting. Normally, a slide rod is slidably disposed in and extends from the fitting and is secured to the core element at one end and has a knob attached at the other end so that the knob may be manually grasped for moving the slide rod into and out of the fitting. In a variation of this type of control assembly, a controll member or tab extends away from the core element in a direction which is substantially transverse to the core element. Such an assembly is disclosed in U.S. Patent 3,342,081 in the name of Winthrop B. Conrad and assigned to the assignee of the instant invention. In that assembly, a plastic fitting is secured to the end of a conduit and has a slideway or an elongated groove in which a slider member is slidably disposed. A tab extends from the slider member in a direction which is generally transverse to the core element so that it may be manually grasped for moving the slider member along the groove in the fitting for moving the core element. Although such assemblies perform very well in most instances, it is frequently difficult to maintain the proper tolerances in the component parts among various different assemblies such as to provide a constant resistant to the movement of the slider member relative to the fitting.

Accordingly, it is an object and feature of this invention to provide an improved remote control assembly of the type having a manually graspable control member extending substantially transversely away from the core element with means to control or provide a predetermined resistance to the sliding movement thereof.

Another object and feature of this invention is to provide a remote control assembly including a support body with a slider member slidably supported by the support body and means movable with the slider member to urge the slider member against the support body for providing a predetermined resistance to the sliding movement thereof.

A further object and feature of this invention is to provide a remote control assembly including a support body with a slider member slidably supported by the support body and including a snap-on means for receiving and removably retaining a core element thereto.

A still further object and feature of this invention is to provide a remote control assembly including a support body having a wall with an elongated slot therein with a slider member slidably disposed on one face of the wall and extending through the slot with a washer-like member disposed on the slider member and engaging the opposite face of the wall for providing a predetermined resistance to the movement of the slide member.

In correlation with the foregoing object and feature of the invention, another object and feature is to control the wear respectively of the support body, the slider member, and the washer-like member by making the bearing portions of the slider member and the washer-like member of plastic materials respectively having a different hardness than the material of the body, thereby preventing galling of the respective bearing surfaces.

In general, these and other objects and features of this invention may be attained in a preferred embodiment including a support body made of plastic and having a recessed wall so that a cavity is provided on one face of the wall. A flexible conduit is attached to the support body. A motion transmitting core element is movably supported in the conduit and extends from either end of the conduit. The wall has an elongated slot therein and a slider member is disposed in the cavity so as to bear against one face of the wall and extend through the slot for supporting the washer-like member on the other side of the wall. The washer-like member is resilient so that both the slider member and the washer-like member are in bearing, sliding engagement with the opposite faces of the wall. The slider member includes a tab disposed in the cavity and may be manually grasped for moving the slider member along the slot. The core element is snapped onto or otherwise attached to the slider member. To prevent galling, the support body, the sliding member and the washer are respectively made of plastic or organic polymeric materials, but materials having different hardnesses. In the preferred embodiment, the plastic material of the slider member is harder than the respective plastic materials of the support body and the washer-like member and the washer-like member is of a plastic material softer than the plastic material of the support body. The softer plastic materials wear and thereby prevent galling or roughing of the components which in turn would cause erratic or unsatisfactory operation of the assembly.

Other objects, features and advantages of the present invention will be readily appreciated as the same becomes better understood by reference to the following detailed description when considered in connection with the accompanying drawings wherein:

FIGURE 1 is a view of a preferred embodiment of the remote control assembly of the instant invention;

FIGURE 2 is a cross-sectional view taken substantially along line 2—2 of FIGURE 1;

FIGURE 3 is a view taken substantially along line 3—3 of FIGURE 2;

FIGURE 4 is a cross-sectional view taken substantially along line 4—4 of FIGURE 1; and FIGURE 5 is a cross-sectional view taken substantially along line 5—5 of FIGURE 1.

Referring now to the drawings, wherein like numerals indicate like or corresponding parts throughout the several views, a preferred embodiment of the remote control assembly of the instant invention is generally shown at 10. The remote control assembly is of the type which is operated to control a device by transmitting tension or compression in a curved path by a flexible core element 12. The core element 12, as illustrated, is a wire-like member. The entire remote control assembly 10 includes the core element 12, the flexible conduit 14 and the head assembly, which is generally indicated at 16. The conduit 14 movably supports the core element 12 and is attached to the head assembly as will be more specifically hereinafter set forth. The head assembly 16 includes all of the components shown except the core element 12 and the flexible conduit 14.

The head assembly 16 includes a support body, generally indicated at 18, a slider member, generally indicated at 20 and slidably supported by the support body 18, and means comprising the washer-like member 22 movable with the slider member 20 to urge the slider member 20 against the support body 18 for providing a predetermined resistance to the sliding movement thereof.

The support body 18 has a recessed wall 24 for defining or providing a cavity 26 on a first face of the wall 24. In other words, the cavity 26 is defined by the recessed wall 24 and the outwardly extending side walls. The support body 18 is flanged at 28 and has apertures 30 therein through which fastening means may be disposed to secure the support body 18 to a support structure. The body 18 includes a projection 32 extending away from the second face of the wall 24 or upwardly from the wall 24 as viewed in FIGURE 2. A first end of the conduit 14 is secured to the projection 32 by way of the fitting 34. The fitting 34 is molded or otherwise secured to the conduit 14 and has an arrow-shaped end 36 which is snapped into and retained in an aperture in the projection 32. Thus, the conduit 14 is secured to the projection 32 of the support body 18. It will be understood that the plastic support body 18 may be molded to the conduit 14.

The flexible motion transmitting core element 12 is movably supported in the conduit 14 and has a first end thereof 13 extending from the second end 15 of the conduit 14 for attachment to a device to be controlled and a second end 17 thereof extending from the first end of the conduit 14. The ends 13 and 17 of the core element 12 are formed into a plurality of loops so that each end is provided with means for attachment to a control device.

The wall 24 has a slot 38 therein and the slider member includes a bearing portion in sliding engagement with one face of the wall 24 and another portion supports the washer-like member 22 so that bearing portion of the washer-like member is in sliding engagement with the other face of the wall 24. More specifically, the slider member 20 includes a tab portion 40 which is disposed in the cavity 26 and a bearing portion 42 in sliding engagement with the first face of the wall 24 on either side of the slot 38. Additionally, the slider member includes a guide portion 44 which is disposed in the slot 38 and substantially conforms to the width of the slot 38 to prevent rotation or sideways movement of the slider member 20. The slider member 20 also includes a post portion 46 which extends from the guide portion 44 through the slot 38 and away from the second face of the wall 24, i.e., upwardly from the second face of the wall 24 as illustrated in FIGURE 2.

The post portion 46 has a first annular shoulder 48 disposed thereabout and facing the guide portion 44 with a tapered portion extending along the post portion in the opposite direction. The resilient washer-like member 22 is disposed about the post portion 46 and is retained in sliding engagement with the second face of the wall 24 on opposite sides of the slot 38 by the shoulder 48. In assembly, the resilient washer-like member 22 is positioned onto the post 46 and over the shoulder 48 so as to be retained in position as illustrated in FIGURE 2. As will be more fully explained hereinafter, the washer-like member 22 is preferably made of a plastic material softer than the plastic material of which the slider member 20 is made so that the material of the washer-like element 22 moves or flexes as it is moved over the shoulder 48 so as to be snapped into and retained in position. In other words, the washer-like member 22 is snapped into position and retained in position by the shoulder 48 on the post 46.

The end 50 of the post portion 46 is tapered to a second annular shoulder 52 and includes a diametrical slot 54 therein. As noted, the second end 17 of the core element 12 has at least one loop therein which is snapped over the end 50 of the post portion 46 and retained thereon by the second annular shoulder 52. In other words, the slot 54 allows the end portions 50 of the post to move together when the loops of the end 17 of the core element are disposed thereover yet flexes or moves to the original position so that the shoulder 52 retains the loops of the end 17 of the core element in position on the post portion 46. The end 17 of the core element may, however, be removed from the slider member 20.

The bearing portion of the washer-like member 22 is an annular bearing surface 56 disposed about the post portion 46. The washer-like member 22 is resilient at a position inwardly of the bearing surface 56 for urging the bearing portion 56 thereof into sliding engagement with the face of the wall 24. Consequently, the bearing portion 42 of the slider member 20 is also urged into engagement with the opposite face of the wall 24. The washer-like element 22 is at least in part a generally truncated cone with the base thereof defining the annular bearing surface 56. The walls or the cone portion of the washer-like member 22 are flexible so that the resistance to movement of the slider member 20 is determined by the washer-like member 22. It will be understood, of course, that various modifications and shapes may be utilized in the washer-like member 22 to vary its flexibility to control the amount of drag or resistance to movement of the slider member 20. One of the advantages of utilizing the washer-like member 22 is that a substantially constant resistance to the movement of the slider member 20 is provided even though the thickness of the wall 24 varies along the length of the slot 38. In other words, the assembly of the instant invention compensates for variances in tolerances of the thickness of the wall 24 as well as the remaining components.

In the preferred embodiment, the major components; to wit, the slider member 20, the support body 18, and the washer-like elements 22 are made of plastic or organic polymeric materials. However, the important factor is that the bearing surfaces of the respective components be made of plastic materials which have different hardnesses. In other words, the bearing surfaces alone may be made of plastic materials of different hardness while the remainder of the respective components may be made of different materials. If the bearing surfaces are made of materials of the same hardness, galling or roughing of the respective components frequently occurs so that it is difficult to move the slider member 20 and sometimes, even if the slider member 20 can be moved, the movement is erratic. In the broadest sense, the slider member 20 and the washer-like member 22 are preferably made of plastic materials which are respectively of a different hardness than the material of the support body 18. This prevents galling along the bearing surfaces between the support body 18 and the washer-like member 22 and the slider member 20. In a more specific sense, the support body 18 is preferably made of a plastic material and the plastic material of which the slider member 20 is made is harder than the plastic material of the support body 18. In the embodiment illustrated, the washer-like member 22 preferably flexes as it is snapped into position on the post portion 46; thus, it is preferable that the plastic material of the washer-like member 22 be softer or less hard than the plastic material of the slider member 20. To prevent galling between the washer-like member 22 and the support body 18, therefore, it is preferable that the plastic material of the washer-like member 22 be softer than the hardness of the plastic material of the support body 18. In one preferred embodiment, the support body 18 is made of acrylonitrile butadiene styrene, a terpolymer commonly referred to as ABS, the slider member 20 is made of delrin or nylon and the washer-like member 22 is made of polypropylene or polyethylene with the order of hardness being the slider member, the support body, and then the washer-like member.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A head assembly for a motion transmitting remote control assembly of the type which is operated to control a device by transmitting tension or compression in a curved path by a flexible core element, said assembly comprising a support body, a slider member slidably supported by said support body, and means movable with said slider member to urge said slider member against said support body for providing resistance to the sliding movement thereof, said support body having first and second bearing faces on opposed extremities thereof, said slider member including a bearing portion in sliding engagement with said first face and another portion supporting said means so that said means is in sliding engagement with said second face whereby at least a portion of said support body is disposed between said bearing portion of said slider member and said means.

2. A head assembly as set forth in claim 1 wherein said portion of said support body which is disposed between said bearing portion of said slider member and said means is a wall defining said bearing faces on the opposite surfaces thereof.

3. A head assembly as set forth in claim 2 wherein said means is resilient.

4. A head assembly as set forth in claim 3 wherein said bearing portion of said slider member and said bearing portion of said means are made of plastic materials having a different hardness than the material of said body.

5. A head assembly as set forth in claim 4 wherein the faces of said wall, which are in sliding engagement with said slider member and said means, are made of plastic material which is softer than said plastic material of said bearing portion of said slider member.

6. A head assembly as set forth in claim 5 wherein said plastic material of said bearing portion of said means is of a different hardness than the plastic material of said bearing portion of said slider member.

7. A head assembly as set forth in claim 6 wherein said plastic material of said bearing portion of said slider member is harder than said plastic material of said bearing portion of said means.

8. A head assembly as set forth in claim 3 wherein said wall of said body has an elongated slot therein and said another portion of said slider member is a post portion extending through said slot, said means being retained on said post portion and extending therefrom to said bearing portion thereof which is in sliding engagement with said other face of said wall.

9. A head assembly as set forth in claim 8 wherein said means comprises a washer-like member.

10. A head assembly as set forth in claim 9 wherein said bearing portion of said washer-like member is an annular bearing surface disposed about said post portion, said washer-like member being resilient at a position radially inwardly of said bearing portion for urging said bearing portion thereof into sliding engagement with said other face of said wall.

11. A head assembly as set forth in claim 10 wherein said washer-like member is at least in part a generally truncated cone with the base thereof defining said annular bearing surface.

12. A head assembly as set forth in claim 10 wherein said slider member and said washer-like member are made of plastic materials respectively having a different hardness than the material of said body.

13. A head assembly as set forth in claim 12 wherein said body is made of a plastic material and said plastic material of said slider member is harder than said plastic material of said body.

14. A head assembly as set forth in claim 13 wherein said plastic material of said washer-like member is of a different hardness than the plastic material of said slider member.

15. A head assembly as set forth in claim 14 wherein said plastic material of said slider member is harder than said plastic material of said washer-like member.

16. A head assembly as set forth in claim 10 wherein said post portion includes means coacting with said washer-like member so that the latter is snapped into and retained in position on said post portion.

17. A head assembly as set forth in claim 16 including a conduit attached to said support body, and a core element movably disposed in said conduit, one end of said core element extending from said conduit and attached to said post portion of said slider member.

18. A motion transmitting remote control assembly of the type which is operated to control a device by transmitting tension or compression in a curved path by a flexible core element, said assembly comprising; a flexible conduit, a support body having a recessed wall for providing a cavity on a first face thereof, said body including a projection extending away from a second face of said wall, said wall having an elongated slot therein, a first end of said conduit being secured to said projection, a flexible motion transmitting core element movably supported in said conduit with a first end thereof extending from the second end of said conduit for attachment to a device to be controlled and a second end thereof extending from the first end of said conduit; a slider member including a tab portion disposed in said cavity, a bearing portion in sliding engagement with said first face of said wall on either side of said slot, a guide portion disposed in said slot, and a post portion extending from said guide portion and through said slot and away from the second face of said wall; said post portion having an annular shoulder disposed thereabout and facing said guide portion and a tapered portion extending along said post portion from said shoulder in the opposite direction, and a resilient member disposed about said post portion and retained in sliding engagement with said second face of said wall on opposite sides of said slot by said shoulder, the end of said post portion being tapered to a second shoulder with a diametrical slot therein, said second end of said core element having at least one loop therein and snapped over said post portion and retained thereon by said second shoulder so that said core element is moved as said slider member is moved along said slot.

19. A motion transmitting remote control assembly as set forth in claim 18 wherein said slider member and said resilient member are made of plastic materials respectively having a different hardness than the material of said body.

20. A motion transmitting remote control assembly as set forth in claim 19 wherein said body is made of a plastic material and said plastic material of said slider member is harder than said plastic material of said body.

21. A motion transmitting remote control assembly as set forth in claim 20 wherein said plastic material of said resilient member is of a different hardness than the plastic material of said slider member.

22. A motion transmitting remote control assembly as set forth in claim 21 wherein said plastic material of said slider member is harder than said plastic material of said resilient member.

23. A motion transmitting remote control assembly of the type which is operated to control a device by transmitting tension and compression in a curved path, said assembly comprising; a support body adapted to be connected to a support structure, a flexible motion transmitting core element, a slider member slidably supported by said support body, said slider member including snap-on means integral therewith, said core element snapped into engagement with said snap-on means so as to be removably retained to said slider member.

24. An assembly as set forth in claim 23 wherein said snap-on means comprises a post portion with a tapered end extending to a shoulder and having a diametrical slot therein, said core element having at least one loop snapped over said shoulder and retained on said post by said shoulder.

25. An assembly as set forth in claim 24 including a conduit having a first end secured to said support body, said core element extending from each end of said conduit.

References Cited

UNITED STATES PATENTS

| | | | |
|---|---|---|---|
| 2,114,359 | 4/1938 | Seljé | 74—502 |
| 2,528,325 | 10/1950 | Valprey | 74—501 |
| 2,620,596 | 12/1952 | Abrahamson | 74—501 |
| 2,844,999 | 7/1958 | Wendela | 74—491 |
| 2,933,942 | 4/1960 | Boylan et al. | 74—501 |
| 3,082,642 | 3/1963 | Hammerand | 74—566 |
| 3,115,225 | 12/1963 | Fraylick et al. | |
| 3,231,300 | 1/1966 | Moroney. | |
| 3,342,081 | 9/1967 | Conrad | 74—501 |
| 3,398,600 | 8/1968 | White et al | 74—501 |

FRED C. MATTERN, Jr., Primary Examiner

CAROLYN F. GREEN, Assistant Examiner

U.S. Cl. X.R.

74—501; 200—16, 161; 285—424